(12) United States Patent
Zhukov et al.

(10) Patent No.: US 8,680,718 B2
(45) Date of Patent: Mar. 25, 2014

(54) METHOD AND DEVICE FOR THE HIGH-SPEED AUTOMATIC ACTIVATION OF A BACKUP CONSUMER ELECTRICAL POWER SUPPLY

(76) Inventors: Vladimir Anatolievich Zhukov, Moscow (RU); Valery Mihailovich Pupin, Moscow (RU)

( * ) Notice: Subject to any disclaimer, the term of this patent is extended or adjusted under 35 U.S.C. 154(b) by 123 days.

(21) Appl. No.: 13/318,203

(22) PCT Filed: Apr. 30, 2009

(86) PCT No.: PCT/RU2009/000210
§ 371 (c)(1),
(2), (4) Date: Feb. 14, 2012

(87) PCT Pub. No.: WO2010/126391
PCT Pub. Date: Nov. 4, 2010

(65) Prior Publication Data
US 2012/0169121 A1    Jul. 5, 2012

(51) Int. Cl.
*H01H 35/00* (2006.01)
(52) U.S. Cl.
USPC .......................................................... 307/116
(58) Field of Classification Search
None
See application file for complete search history.

(56) References Cited

U.S. PATENT DOCUMENTS 5,498,913 A * 3/1996 Moritani ........................ 307/64

FOREIGN PATENT DOCUMENTS

| GB | 2259199 A | 3/1993 |
|---|---|---|
| RU | 2030056 C1 | 2/1995 |
| RU | 2030056 C1 * | 2/1995 |
| RU | 2326481 C1 * | 6/2008 |
| RU | 2326481 C1 | 6/2008 |
| SU | 1728927 A1 | 4/1992 |

OTHER PUBLICATIONS

Partial english translation of Gamazin document.*
English translation of International search report.*

* cited by examiner

*Primary Examiner* — Rexford Barnie
*Assistant Examiner* — Rasem Mourad
(74) *Attorney, Agent, or Firm* — Harness, Dickey & Pierce, P.L.C.

(57) ABSTRACT

A method and device for automatic activation of a backup supply is provided that measures the positive-phase-sequence voltage of the busbars in a backup power source, the linear voltages at the busbars in the primary power source and the angle between the vectors of the positive-phase-sequence voltages of the busbars in both power sources. The method and device also measures the value of the rms current in a phase and the value of the angle between the vector of the complex rms current in the same phase and of the vectorial sum of the complex rms voltage between the two other phases at the busbars in the primary power source and the received portion. The power supply to the busbars is switched from the primary source to the backup source in the event of any of the above-mentioned magnitudes departing from the range of permissible values for these magnitudes.

4 Claims, 1 Drawing Sheet

METHOD AND DEVICE FOR THE HIGH-SPEED AUTOMATIC ACTIVATION OF A BACKUP CONSUMER ELECTRICAL POWER SUPPLY

BACKGROUND

1. Field

The invention relates to electrical engineering, in particular, to automated emergency devices for electrical substations and switchgears of low, medium and high voltage, and can be used for detecting failures of power supply to consumers from a primary power source due to any faults in the power circuit of a switchgear section, and for quick switching to a backup power source.

2. Description of the Related Art

A known method for automatic activation of a backup power supply to consumers (USSR Inventor's Certificate No. 1728927, H 02 J 9/06, 1990) is embodied by measuring a positive-phase-sequence voltage at busbars in a primary and a backup power sources and by measuring an angle between vectors of the positive-phase-sequence voltages at busbars in the primary and the backup power sources. The direction of active power flow at input of the primary power source busbars is then determined. The busbars of the primary source are switched to the backup source if the positive-phase-sequence voltage in the primary power source is below a set value or if the angle between the vectors of the positive-phase-sequence voltages exceeds a value, and when the active power flow is directed from the busbars to the primary power source. The direction and value of a reactive component of the positive-phase-sequence current at input of the primary source busbars, value of the negative-phase-sequence voltage at the busbars in the primary source are determined. When directing the positive-phase-sequence reactive current component from the busbars to the primary source, if said reactive component and the negative-phase-sequence voltage of the busbars in the primary source exceed the values, the busbars are switched from the primary source to the backup source, Field forcing of synchronous motors is performed in all cases simultaneously with the switching procedure.

Unfavorably, the above method does not provide determination of single-phase, double-phase and double-phase line-to-ground short circuits in power circuits for supply to consumers due to the fact that direction of active power at the input of substation in these modes remains unchanged, and the active power is still used by connected consumers. In case of any short circuits in the power circuits, direction of the reactive component of the positive-phase-sequence voltage remains unchanged if no motor load is applied to the switchgear section.

SUMMARY

An object of the invention is to enable a quick reaction to any failures of power supply to consumers, occurring in a primary power circuit and including all types of short circuits, and subsequent switching to a backup power source. The method enables a quick reaction to power supply failures at switchgears with or without motor drive load, as well as switchgears powered by out-of-phase power sources.

According to at least one embodiment, a method for automatic activation of a backup power supply to consumers may be provided. The method includes measuring a positive-sequence voltage at busbars in a backup power source. The method also includes measuring, at the input of a primary power supply, a value of a rms current in a phase for each of three phases and a value of an angle between a vector of a complex rms current in the same phase and of a vectorial sum of a complex rms voltage between the two other phases at the busbars in the primary power source and a received portion of the analogous complex rms voltage at the busbars in the backup power source. The method also includes measuring linear voltages at the busbars in a primary power source. The power supply to the busbars may switch from the primary source to the backup source if any of the measured voltages at the busbars in the primary power source are lower than a set value, and if, simultaneously, the value of the rms current in a phase and the value of the angle between the vector of the complex rms current in the same phase and of the vectorial sum of the complex rms voltage reach a set range of values, and if the positive-sequence voltage at the busbars in the backup power source exceeds a set value.

According to another example embodiment, a method for automatic activation of a backup power supply to consumers may be provided. The method may include measuring a positive-sequence voltage at busbars in a backup power source and an angle between vectors of the positive-sequence voltages at the busbars in a primary source and the busbars in the backup power source. The method may also include measuring, at the input of the primary power supply, a value of a rms current in a phase for each of the three phases and a value of an angle between a vector of a complex rms current in the same phase and of a vectorial sum of a complex rms voltage between the two other phases at the busbars in the primary power source and a received portion of the analogous complex rms voltage at the busbars in the backup power source. The power supply to the busbars from the primary source may switch to the backup source if the angle between the vectors of the positive-sequence voltages at the busbars in the primary and the backup power sources exceeds a set value, if, simultaneously, the value of the rms current in a phase and the value of the angle between the vector of the complex rms current in the same phase and of the vectorial sum of the complex rms voltage reach a set range of values, and if the positive-sequence voltage at the busbars in the backup power source exceeds a set value.

According to another example embodiment, a method for automatic activation of a backup power supply to consumers may be provided. The method may include measuring a positive-sequence voltage at the busbars in a backup power source. The method may include measuring, at the input of a primary power supply, a value of a rms current in a phase for each of three phases and a value of an angle between a vector of a complex rms current in the same phase and of a vectorial sum of a complex rms voltage between the two other phases at the busbars in the primary power source and a received portion of the analogous complex rms voltage at the busbars in the backup power source. The method may also include measuring a change in the angle between the vectors of the positive-sequence voltages at the busbars in the primary and the backup power sources over a set period of time. The power supply to the busbars may switch from the primary source to the backup source if the change in the angle between the vectors of the positive-sequence voltages at the busbars in the primary and the backup power sources over the set period of time exceeds a set value, and if, simultaneously, the value of the rms current in a phase and the value of the angle between the vector of the complex rms current in the same phase and of the vectorial sum of the complex rms voltage reach a set range of values, and if the positive-sequence voltage at the busbars in a backup power source exceeds a set value.

According to another example embodiment, a device for automatic activation of a backup power supply to consumers may be provided. The device may include a primary power source and a backup power source; input switches of the primary and backup power sources; a sectionalizing switch; busbars of the primary and backup power sources; a set of measuring current transformers arranged at the input of the primary power source; sets of measuring voltage transformers arranged at the busbars of the primary and backup power sources; an automatic backup activation starter including a tertiary phase current recovery unit, an analog-to-digital current converter provided with three output channels connected at the input thereof with the output of the set of measuring current transformers via the tertiary phase current recovery unit, analog-to-digital voltage converters provided with three output channels connected at the input thereof with the outputs of the sets of measuring voltage transformers at the busbars of the primary and backup power sources, positive-sequence voltage measuring units at the busbars of the primary and backup power sources connected at the input thereof with the output channels of the analog-to-digital voltage converters at the busbars of the primary and backup power sources respectively, a maximum voltage relay unit connected at the input thereof with the output of the positive-sequence voltage measuring unit at the busbars of the backup power source, a relay unit for measuring an angle between vectors of the positive-sequence voltages of the busbars in the primary and the backup power sources connected at the inputs thereof with the positive-sequence voltage measuring units at the busbars of the primary and backup power sources, special current direction phase relay units, each connected to one of the three output channels of the analog-to-digital current converter, said channel being a current channel in one of the phases of the primary power source, to one of the three output channels of the analog-to-digital voltage converter at the busbars of the primary power source, said channel being a voltage channel at the busbars of the primary power source between two other phases, and to one of the three output channels of the analog-to-digital voltage converter at the busbars of the backup power source, said channel being a voltage channel at the busbars of the backup power source between the same phases as at the busbars of the primary power source; a minimum (out of the three) voltage relay unit connected at the inputs thereof with the output channels of the analog-to-digital voltage converter at the busbars of the primary power source, a relay unit for determining the change in the angle between the vectors of the positive-sequence voltages at the busbars in the primary and the backup power sources over a set period of time connected at the respective inputs thereof with the positive-sequence voltage measuring units at the busbars of the primary and backup power sources; a NAND binary-logic element connected at the respective inputs thereof with the outputs of the special current direction phase relay units; an AND binary-logic element connected at the respective inputs thereof with the outputs of the minimum (out of the three) voltage relay unit, with the outputs of the maximum voltage relay unit, and with the outputs of the NAND binary-logic element; a second AND binary-logic element connected at the respective inputs thereof with the outputs of the maximum voltage relay unit, with the outputs of the relay unit for measuring the angle between the vectors of the positive-sequence voltages at the busbars in the primary and the backup power sources, and with the outputs of the NAND binary-logic element; a third AND binary-logic element connected at the inputs thereof with the outputs of the maximum voltage relay unit, with the outputs of the relay unit for determining the change in the angle between the vectors of the positive-sequence voltages at the busbars in the primary and the backup power sources over a set period of time, and with the outputs of the NAND binary-logic element; an OR binary-logic element connected at the respective inputs thereof with the outputs of the three AND binary-logic elements; and an output unit configured to send a backup activation command, the output unit connected at the input thereof with the output of the OR binary-logic element, and connected at the output thereof with the input switch of the primary power source over the switch trip channel and with the sectionalizing switch over the switch close channel; a switching device configured to switch to the backup power source by closing the primary contacts at a time interval similar to a common-mode time interval between like voltages at the busbars of the primary and backup power sources, the switching device activated upon the backup activation command from the automatic backup activation starter.

According to another example embodiment, a device for automatic activation of a backup power supply to consumers may be provided. The device may include a primary power source and a backup power source; busbars of the primary and backup power sources; an automatic backup activation starter including positive-sequence voltage measuring units configured to measure the voltage at the busbars of the primary and backup power sources, a relay unit configured to measure an angle between vectors of the positive-sequence voltages of the busbars in the primary and the backup power sources, a relay unit configured to determine the change in the angle between the vectors of the positive-sequence voltages at the busbars in the primary and the backup power sources over a set period of time and an output unit including logic functions configured to select conditions for switching to the backup power source and send a backup activation command; and a switching device configured to switch to the backup power source by closing the primary contacts at a time interval similar to a common-mode time interval between like voltages at the busbars of the primary and backup power sources, the switching device activated upon the backup activation command from the automatic backup activation starter.

BRIEF DESCRIPTION OF THE DRAWINGS

Example embodiments will be more clearly understood from the following brief description taken in conjunction with the accompanying drawings.

FIG. 1 is a single-line diagram of a switchgear according to an example embodiment.

FIG. 2 is an example of operation of a special current direction phase relay unit on a complex plane.

Figure 1:
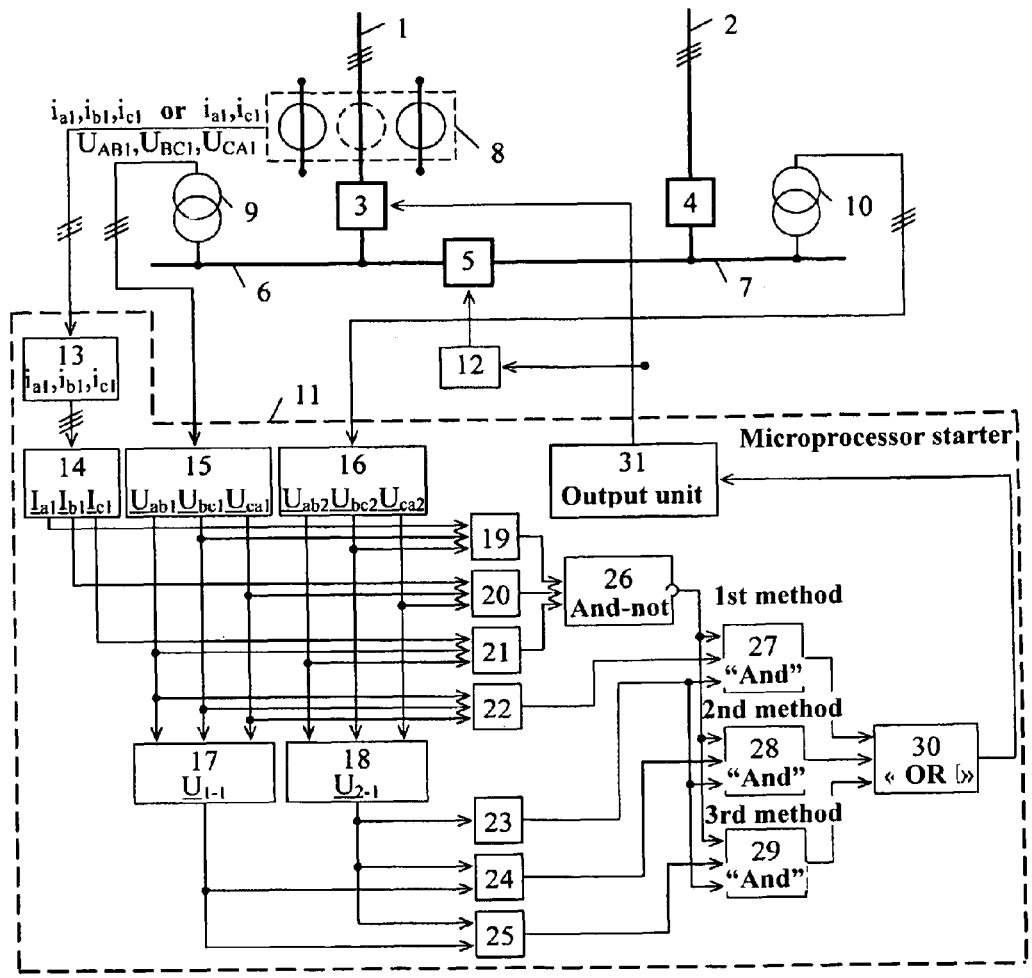
FIGS. 1-2 represent non-limiting, example embodiments as described herein.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION

Example embodiments will now be described more fully with reference to the accompanying drawings, in which example embodiments are shown. Example embodiments may, however, be embodied in many different forms and should not be construed as being limited to the embodiments set forth herein; rather, these embodiments are provided so that this disclosure will be thorough and complete, and will fully convey the concept of example embodiments to those of ordinary skill in the art. In the drawings, the thicknesses of layers and regions are exaggerated for clarity. Like reference numerals in the drawings denote like elements, and thus their description will be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like numbers indicate like elements throughout. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle may have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

The method of quick automatic activation of a backup power supply to consumers and the device therefor can be used for detecting failures of power supply to consumers from a primary power source due to any faults in the power circuit of a switchgear section, and for quick switching to the backup power source.

FIG. 1 is a single-line diagram of a switchgear, including an input switch and a sectionalizing switch, current and measuring voltage transformers, a flowchart illustrating the operation of a microprocessor starter of the quick automatic backup activation, and an intermediate switch control device.

FIG. 1 illustrates a device for quick automatic activation of a backup power supply to consumers according to an example embodiment. The device includes, a primary power source 1 and a backup power source 2, input switches 3 and 4 of the primary and backup power sources, a sectionalizing switch 5, busbars 6 and 7 of the primary and backup power sources, a set of measuring current transformers 8 arranged at the input of the primary power source 1, the set consisting of two or three transformers, sets of measuring voltage transformers 9 and 10 arranged at the busbars 6 and 7 of the primary and backup power sources, respectively, each set consisting of three transformers, a microprocessor starter 11 for quick automatic backup activation, and a switching device 12 for switching to the backup power source 2 (to close primary contacts of the sectionalizing switch) at a time interval similar to a common-mode time interval between like voltages at the busbars 6 and 7 of the primary and backup power sources, said switching activated upon receipt of a command from the microprocessor starter 11 to quick activate backup power supply.

The starter 11 includes a tertiary phase current recovery unit 13 (required when only two transformers are used in the set of measuring current transformers 8), an analog-to-digital current converter 14 provided with three output channels $I_{a1}$, $I_{b1}$, $I_{c1}$ and connected at the input thereof with the output of the set of measuring current transformers 8 via the tertiary phase current recovery unit 13, analog-to-digital voltage converters 15 and 16 provided with three output channels $U_{ab1}$, $U_{bc1}$, $U_{ca1}$ and $U_{ab2}$, $U_{bc2}$, $U_{ca2}$ and connected at the inputs thereof to the outputs of the sets of measuring voltage transformers 9 and 10 at the busbars of the primary and backup power sources, positive-phase-sequence voltage measuring units 17 and 18 at the busbars 6 and 7 of the primary and backup power sources, connected at the inputs thereof with the output channels of the analog-to-digital voltage converters 15 ($U_{ab1}$, $U_{bc1}$, $U_{ca1}$) and 16 ($U_{ab2}$, $U_{bc2}$, $U_{ca2}$), special current direction phase relay units 19, 20, 21, each controlling one of the three output channels $I_{a1}$, $I_{b1}$, $I_{c1}$ of the analog-to-digital current converter 14 respectively (current value in one of the phases of the primary power source), one of the three output channels $U_{bc1}$, $U_{ab1}$, $U_{ca1}$ of the analog-to-digital voltage converter 15 (voltage value at the busbars of the primary power source between two other phases) and one of the three output channels $U_{bc2}$, $U_{ab2}$, $U_{ca2}$ of the analog-to-digital voltage converter 16 (voltage value at the busbars of the backup power source between the same phases as at the busbars of the primary power source), a minimum (out of the three) voltage relay unit 22, the inputs thereof controlling the output channels $U_{ab1}$, $U_{bc1}$, $U_{ca1}$ of the analog-to-digital voltage converter 15, a maximum voltage relay unit 23 connected at the input thereof with the output of the positive-phase-sequence voltage measuring unit 18 at the busbars of the backup power source 7, a relay unit 24 for determining the angle between the vectors of the positive-phase-sequence voltages of the busbars in the primary and the backup power sources 6 and 7 connected at the input thereof with the positive-phase-sequence voltage measuring units 17, 18 at the busbars of the primary and the backup power sources 6 and 7, a relay unit 25 for determining the change in the angle between the vectors of the positive-phase-sequence voltages of the busbars over a set time interval in the primary and the backup power sources 6 and 7 connected at the input thereof with the positive-phase-sequence voltage measuring units 17, 18 at the busbars of the primary and the backup power sources 6 and 7, a NAND binary-logic element 26 connected at the inputs thereof with the outputs of the special current direction phase relay units 19, 20, 21, an AND binary-logic element 27 connected at the inputs thereof with the outputs of the minimum (out of the three) voltage relay unit 22, with the outputs of the maximum voltage relay unit 23, and with the outputs of the NAND binary-logic element 26, an AND binary-logic element 28 connected at the inputs thereof with the outputs of the maximum voltage relay unit 23, with the outputs of the relay unit 24 for determining the angle between the vectors of the positive-phase-sequence voltages of the busbars in the primary and the backup power sources 6 and 7, and with the outputs of the NAND binary-logic element 26, an AND binary-logic element 29 connected at the inputs thereof with the outputs of the maximum voltage relay unit 23, with the outputs of the relay unit 25 for determining the change in the angle between the vectors of the positive-phase-sequence voltages of the busbars over a set time interval in the primary and the backup power sources 6 and 7, and with the outputs of the NAND binary-logic element 26, an OR binary-logic element 30 connected at the inputs thereof with the outputs of the AND binary-logic elements 27, 28, 29, and an output unit 31 connected at the input thereof with the output of the OR binary-logic element 30, and connected at the output thereof with the input switch 3 of the primary power source over the switch trip channel and with the sectionalizing switch 5 over the switch close channel via a switching device 12 for selecting conditions (specific time) for switching to the backup power source 2, wherein the switching device 12 is activated upon receiving a quick backup activation command from the microprocessor starter 11.

Figure 2:
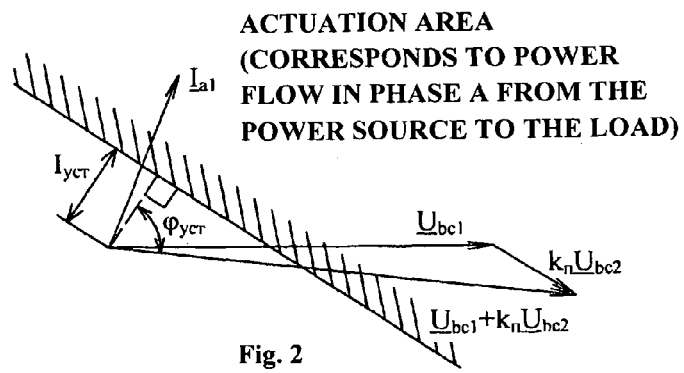

FIG. 2 shows a complex plane.

$I_{a1}$ is a vector corresponding to the complex effective current value $I_{a1}$ in phase A at the input of the primary power source 1.

$U_{bc1}$ is a vector corresponding to the complex effective voltage value between phases B and C at the busbars of the primary power source 6.

$k_P U_{bc2}$—is a vector corresponding to the multiplication product of the complex effective voltage value $U_{bc2}$ between phases B and C at the busbars of the backup power source 7 and the $k_P$ coefficient, which is a preset value (set by unit 19) of infeed from the busbars of the backup power source 7.

$U_{bc1}\ k_P U_{bc2}$ is a vectorial sum of $U_{bc1}\ k_P U_{bc2}$; $\varphi_{set}$ is a preset value (set by unit 19) of the angle between the perpendicular to the actuation area boundary and the vector $U_{bc1}\ k_P U_{bc2}$.

$I_{set}$ is a preset value (set by unit 19) of the current; when the vector $I_{a1}$ enters the actuation area, it is considered that power flow in phase A is directed from the power source to the load.

The starter controls the instantaneous values of linear voltages at the busbars of the primary power source 6 ($u_{ab1}$, $u_{bc1}$, $u_{ca1}$) and the backup power source 7 ($u_{ab2}$, $u_{bc2}$, $u_{ca2}$) by means of the sets of measuring voltage transformers 9 and 10. The starter controls the instantaneous values of phase currents at the input of the primary power source 1 by means of the set of measuring current transformers 8 ($i_{a1}$, $i_{b1}$, $i_{c1}$ or $i_{a1}$, $i_{c1}$ when using only two measuring current transformers).

The measurement results are input into the analog-to-digital converter units 14, 15 and 16 (in case when the set of measuring current transformers consists of two transformers, the current channel passes through the tertiary phase current recovery unit 13, and the value of the tertiary phase current is determined as $I_b = i_a - i_c$), wherein the instantaneous current and voltage values are converted into arrays of complex effective current values at the input of the primary power source 1 ($I_{a1}$, $I_{b1}$, $I_{c1}$) and arrays of complex effective voltage values at the busbars of the primary 6 ($U_{ab1}$, $U_{bc1}$, $U_{ca1}$) and the backup 7 ($U_{ab2}$, $U_{bc2}$, $U_{ca2}$) power sources. In units 17 and 18, the complex effective voltage values $U_{ab1}$, $U_{bc1}$, $U_{ca1}$ and $U_{ab2}$, $U_{bc2}$, $U_{ca2}$ are converted into complex effective positive-phase-sequence voltage values $U_{1-1}$ at the busbars of the primary power source 6 and $U_{2-1}$ at the busbars of the backup power source 7. Further operation of the microprocessor starter is carried out by mathematical and logical processing of the measurement results.

The special current direction phase relay-units 19, 20, 21 are inhibiting units. If the following conditions are met:

$$\operatorname{Re}\left(\frac{((U_{bc1} + k_n U_{bc2}) \cdot I'_{a1} \cdot e^{j\varphi_{ycT}})}{|U_{bc1} + k_n U_{bc2}|}\right) > I_{ycT} \text{ (of unit 19)}$$

$$\operatorname{Re}\left(\frac{((U_{ca1} + k_n U_{ca2}) \cdot I'_{b1} \cdot e^{j\varphi_{ycT}})}{|U_{ca1} + k_n U_{ca2}|}\right) > I_{ycT} \text{ (of unit 20)}$$

$$\operatorname{Re}\left(\frac{((U_{ab1} + k_n U_{ab2}) \cdot I'_{c1} \cdot e^{j\varphi_{ycT}})}{|U_{ab1} + k_n U_{ab2}|}\right) > I_{ycT} \text{ (of unit 21)}$$

$U_{ab1}$, $U_{bc1}$, $U_{ca1}$ are the complex effective voltage values at the busbars of the primary power source 6.

$U_{ab2}$, $U_{bc2}$, $U_{ca2}$ are the complex effective voltage values at the busbars of the backup power source 7.

$I'_{a1}$, $I'_{b1}$, $I'_{c1}$ are the complex numbers conjugated to complex effective current values $I_{a1}$, $I_{b1}$, $I_{c1}$ at the input of the primary power source 1.

$\phi_{set}$ is the preset angle value.

$I_{set}$ is the preset current value; $k_P$ is the preset value of infeed from the busbars of the backup power source 7.

At the outputs of the special current direction phase relay units 19, 20, 21, the signal is equal to logical "1." If at least one of said condition is not met, the output signal of the corresponding special current direction phase relay units 19, 20, 21 is equal to logical "0," and it is then considered that power flow in the corresponding phase is directed from the load to the power source, and the operation of the microprocessor starter 11 is then unblocked.

The principle of operation of the unit 19 on a complex plane is shown in FIG. 2, and the operational algorithm of units 20, 21 is similar when the corresponding input signals are changed. When the end of vector $I_{a1}$ enters the actuation area, it is considered that power flow in phase A is directed from the power source to the load, whereupon the signal at the output of the special current direction phase relay unit 19 becomes equal to logical "1," and when the end of vector $I_{a1}$ leaves the actuation area, the output signal of the unit 19 becomes equal to logical "0."

When power in each of the phases at the input of the primary power source 1 (the flow thereof determined using the above algorithm) is directed from the power source to the load, the starter 11 is off, regardless of what happens in the power supply system. In normal mode, signals at the input of the unit 26 block (via units 27, 28, 29) the signal to trip the input switch 3 of the primary power source and to close the sectionalizing switch 5, and the busbars of the primary and the backup power sources 6 and 7 work independently.

The minimum (out of the three) voltage relay unit 22 is used to detect asymmetric and triple-phase short circuits. The relay unit 24 is used for determining the angle between the vectors of the positive-phase-sequence voltages of the busbars in the primary and the backup power sources 6 and 7. The relay unit 25 is used for determining the change in the angle between the vectors of the positive-phase-sequence voltages of the busbars over a set time interval in the primary and the backup power sources 6 and 7 to detect the head switch tripping at the feeder substation. The maximum voltage relay unit 23 is used to control the normal voltage at the busbars of the backup power source.

The device operation signals are formed by means of NAND (unit 26), AND (units 27, 28, 29) and OR (unit 30) binary-logic elements and are input into the output unit 31 that controls the input switch 3 of the primary power source and the sectionalizing switch 5 via the switching device 12 for selecting conditions for switching to the backup power source 2. The switching device 12 is activated upon receiving a quick backup activation command from the microprocessor starter 11.

In the first embodiment, when power supply failure occurs in the form of asymmetric or triple-phase short circuits in the power source circuit, at least one special current direction phase relay units 19, 20, 21 is switched into the initial position, and the signal at the output(s) thereof becomes equal to logical "0," the minimum voltage $\min(|U_{ab1}|, |U_{bc1}|, |U_{ca1}|)$ falls below the preset value of the minimum (out of the three) voltage relay unit 22 $U_{set.min}$ and, if the voltage $|U_{2-1}|$ at the busbars of the backup power source 7 exceeds the preset value of the maximum voltage relay unit 23 $U_{set.max}$, the starter 11 sends signals to trip the switch of the primary power source 3 and to close the sectionalizing switch 5 via the switching device 12.

In the second embodiment, when another form of power supply failure occurs, e.g. if the head switch is tripped due to incorrect actions of the operating personnel, at least one special current direction phase relay units 19, 20, 21 is switched into the initial position, and the signal at the output(s) thereof becomes equal to logical "0," and the angle $\delta_{12}$ between the vectors of the positive-phase-sequence voltages of the busbars in the primary power source $U_{1-1}$ and of the busbars in the backup power source $U_{2-1}$, equal to $\delta12=\arg(U_{2-1})-\arg(U_{1-1})$ does not meet the condition $\delta_{12}>\delta_{set}$ of the relay unit 24 for determining the angle between the vectors of the positive-phase-sequence voltages of the busbars in the primary and the backup power sources 6 and 7, and, if the voltage $|U_{2-1}|$ at the busbars of the backup power source 7 exceeds the preset value of the maximum voltage relay unit 23 $U_{set.max}$, the starter 11 sends signals to trip the switch of the primary power source 3 and to close the sectionalizing switch 5 via the switching device 12.

In the third embodiment, when the power supply failure (as in the second embodiment) occurs, at least one special current direction phase relay units 19, 20, 21 is switched into the initial position, and the signal at the output(s) thereof becomes equal to logical "0," the change of angle value $\Delta\delta_{12}$ between the vectors of the positive-phase-sequence voltages of the busbars in the primary power source $U_{1-1}$ and of the busbars in the backup power source $U_{2-1}$ over a set time interval $\Delta t_{yCT}$, equal to $\Delta\delta_{12}=\delta_{12}^{(2)}-\delta_{12}^{(1)}$, wherein $\delta_{12}^{(1)}$, $\delta_{12}^{(2)}$ are the values of angle between the vectors of the positive-phase-sequence voltages of the busbars in the primary power source $U_{1-1}$ and of the busbars in the backup power source $U_{2-1}$, in the beginning and the end of the time interval $\Delta t_{yCT}$, meets the condition $\Delta\delta_{12}>\Delta\delta_{set}$ of the relay unit 25 for determining the change in the angle between the vectors of the positive-phase-sequence voltages of the busbars over a set time interval in the primary and the backup power sources 6 and 7, and, if the voltage $|U_{2-1}|$ at the busbars of the backup power source 7 exceeds the preset value of the maximum voltage relay unit 23 $U_{set.max}$, the starter 11 sends signals to trip the switch of the primary power source 3 and to close the sectionalizing switch 5 via the switching device 12.

Therefore, the present method enables a quick reaction to any failures of power supply to consumers, occurring in the primary power circuit and including all types of short circuits, and subsequent switching to the backup power source; said method also enables a quick reaction to power supply failures at switchgears with or without motor drive load, as well as switchgears powered by out-of-phase power sources.

While example embodiments have been particularly shown and described, it will be understood by one of ordinary skill in the art that variations in form and detail may be made therein without departing from the spirit and scope of the claims.

The invention claimed is:

1. A method for automatic activation of a backup power source to consumers, the method comprising:
measuring a positive-phase-sequence voltage at busbars in the backup power source;
measuring, at the input of a primary power source, a value of a rms current in a phase for each of three phases and a value of an angle between a vector of a complex rms current in the same phase and of a vectorial sum of a complex rms voltage between the two other phases at the busbars in the primary power source and a received portion, which is equal to 0-50%, of the analogous complex rms voltage at the busbars in the backup power source;

measuring linear voltages at the busbars in a primary power source; and providing a command to switch a power supply to the busbars from the primary source to the backup source if any of the measured voltages at the busbars in the primary power source are lower than a set value, and if, simultaneously, the value of the rms current in a phase and the value of the angle between the vector of the complex rms current in the same phase and of the vectorial sum of the complex rms voltage between the two other phases at the busbars in the primary power source and the received portion, which is equal to 0-50%, of the analogous complex rms voltage at the busbars in the backup power source reach a set range of values, and if the positive-sequence voltage at the busbars in the backup power source exceeds a set value.

2. A method for automatic activation of a backup power source to consumers, the method comprising:

measuring a positive-phase-sequence voltage at busbars in the backup power source and an angle between vectors of the positive-phase-sequence voltages at the busbars in a primary source and the busbars in the backup power source;

measuring, at the input of the primary power source, a value of a rms current in a phase for each of the three phases and a value of an angle between a vector of a complex rms current in the same phase and of a vectorial sum of a complex rms voltage between the two other phases at the busbars in the primary power source and a received portion, which is equal to 0-50%, of the analogous complex rms voltage at the busbars in the backup power source; and providing a command to switch a power supply to the busbars from the primary source to the backup source if the angle between the vectors of the positive-sequence voltages at the busbars in the primary and the backup power sources exceeds a set value, if, simultaneously, the value of the rms current in a phase and the value of the angle between the vector of the complex rms current in the same phase and of the vectorial sum of the complex rms voltage between the two other phases at the busbars in the primary power source and the received portion, which is equal to 0-50%, of the analogous complex rms voltage at the busbars in the backup power source reach a set range of values, and if the positive-sequence voltage at the busbars in the backup power source exceeds a set value.

3. A method for automatic activation of a backup power source to consumers, the method comprising:

measuring a positive-phase-sequence voltage at the busbars in the backup power source, measuring, at the input of a primary power source, a value of a rms current in a phase for each of three phases and a value of an angle between a vector of a complex rms current in the same phase and of a vectorial sum of a complex rms voltage between the two other phases at the busbars in the primary power source and a received portion, which is equal to 0-50%, of the analogous complex rms voltage at the busbars in the backup power source;

measuring a change in the angle between the vectors of the positive-sequence voltages at the busbars in the primary and the backup power sources over a set period of time; and providing a command to switch a power supply to the busbars from the primary source to the backup source if the change in the angle between the vectors of the positive-phase-sequence voltages at the busbars in the primary and the backup power sources over the set period of time exceeds a set value, and if, simultaneously, the value of the rms current in a phase and the value of the angle between the vector of the complex rms current in the same phase and of the vectorial sum of the complex rms voltage between the two other phases at the busbars in the primary power source and the received portion, which is equal to 0-50%, of the analogous complex rms voltage at the busbars in the backup power source reach a set range of values, and if the positive-phase-sequence voltage at the busbars in a backup power source exceeds a set value.

4. A device for automatic activation of a backup power source to consumers, the device comprising:

a primary power source and the backup power source;
input switches of the primary and backup power sources;
a sectionalizing switch;
busbars of the primary and backup power sources;
a set of measuring current transformers arranged at the input of the primary power source;
sets of measuring voltage transformers arranged at the busbars of the primary and backup power sources;
an automatic backup activation starter including,
a tertiary phase current recovery unit,
an analog-to-digital current converter provided with three output channels connected at the input thereof with the output of the set of measuring current transformers via the tertiary phase current recovery unit,
analog-to-digital voltage converters provided with three output channels connected at the input thereof with the outputs of the sets of measuring voltage transformers at the busbars of the primary and backup power sources,
positive-phase-sequence voltage measuring units at the busbars of the primary and backup power sources connected at the input thereof with the output channels of the analog-to-digital voltage converters at the busbars of the primary and backup power sources respectively,
a maximum voltage relay unit connected at the input thereof with the output of the positive-sequence voltage measuring unit at the busbars of the backup power source, and
a relay unit for measuring an angle between vectors of the positive-sequence voltages of the busbars in the primary and the backup power sources connected at the inputs thereof with the positive-sequence voltage measuring units at the busbars of the primary and backup power sources; and a device for switching to the backup power source with closing of the primary contacts at a time interval similar to a common-mode time interval between like voltages at the busbars of the primary and backup power sources, said switching activated upon receipt of a command from the automatic backup activation starter to activate backup power supply, wherein the automatic backup activation starter further includes,
special current direction phase relay units, each connected to one of the three output channels of the analog-to-digital current converter, said channel being a current channel in one of the phases of the primary power source, to one of the three output channels of the analog-to-digital voltage converter at the busbars of the primary power source, said channel being a voltage channel at the busbars of the primary power source between two other phases, and to one of the three output channels of the analog-to-digital voltage converter at the busbars of the backup power source, said channel being a voltage channel at the busbars of the backup power source between the same phases as at the busbars of the primary power source, a minimum (out of the three) voltage relay unit connected at the inputs thereof with the output channels of the analog-to-digital voltage converter at the busbars of the primary power source, a relay unit for determining the change in the angle between the vectors of the positive-phase-sequence voltages at the busbars in the primary and the backup power sources over a set period of time connected at the respective inputs thereof with the positive-phase-sequence voltage measuring units at the busbars of the primary and backup power sources, a NAND binary-logic element connected at the respective inputs thereof with the outputs of the special current direction phase relay units, an AND binary-logic element connected at the respective inputs thereof with the outputs of the minimum (out of the three) voltage relay unit, with the outputs of the maximum voltage relay unit, and with the outputs of the NAND binary-logic element, a second AND binary-logic element connected at the respective inputs thereof with the outputs of the maximum voltage relay unit, with the outputs of the relay unit for measuring the angle between the vectors of the positive-phase-sequence voltages at the busbars in the primary and the backup power sources, and with the outputs of the NAND binary-logic element, a third AND binary-logic element connected at the inputs thereof with the outputs of the maximum voltage relay unit, with the outputs of the relay unit for determining the change in the angle between the vectors of the positive-phase-sequence voltages at the busbars in the primary and the backup power sources over a set period of time, and with the outputs of the NAND binary-logic element, an OR binary-logic element connected at the respective inputs thereof with the outputs of the three AND binary-logic elements, and an output unit configured to send a backup activation command, the output unit connected at the input thereof with the output of the OR binary-logic element, and connected at the output thereof with the input switch of the primary power source over the switch trip channel and with the sectionalizing switch over the switch close channel via the device for switching, the device for switching being configured to select conditions for switching to the backup power source, wherein said device for switching is activated upon receiving a backup activation command from the starter a switching device configured to switch to the backup power source by closing the primary contacts at a time interval similar to a common-mode time interval between like voltages at the busbars of the primary and backup power sources, the switching device activated upon the backup activation command from the automatic backup activation starter.

\* \* \* \* \*